US006723454B2

(12) United States Patent
Verhoeven et al.

(10) Patent No.: US 6,723,454 B2
(45) Date of Patent: Apr. 20, 2004

(54) LUMINESCENT DEVICE

(75) Inventors: Jan Willem Verhoeven, Koog aan de Zaan (NL); Martinus Henricus Valentinus Werts, Amsterdam (NL); Johannes Willem Hofstraat, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/553,603

(22) Filed: Apr. 20, 2000

(65) Prior Publication Data

US 2003/0012979 A1 Jan. 16, 2003

(30) Foreign Application Priority Data

Apr. 23, 1999 (EP) ............................................. 99201270

(51) Int. Cl.[7] ............................................... H05B 33/14
(52) U.S. Cl. ........................ 428/690; 428/917; 313/504; 313/506; 257/94; 257/103
(58) Field of Search ................................. 428/690, 704, 428/917; 313/503, 504, 506; 257/94, 103; 252/301.16, 301.17, 301.18

(56) References Cited

U.S. PATENT DOCUMENTS 4,801,722 A  *  1/1989  Hinshaw et al.
5,095,099 A  *  3/1992  Parkinson et al.
5,281,489 A  *  1/1994  Mori et al. ................. 428/690
5,756,224 A  *  5/1998  Börner et al. ............... 428/690

FOREIGN PATENT DOCUMENTS

EP         0697744 A1    2/1996    ........... H01L/33/00
WO        WO9858037     12/1998    ........... C09K/11/06

OTHER PUBLICATIONS

Edwards A Et Al: "Photoluminescene and Electroluminescence of New Lanthanide–(Methyoxybenzoyl) Benzoate Complexes" Journal of Applied Physics, US, American Institute of Physics. New York, vol. 82, No. 4 Aug. 15, 1997, pp. 1841–1846.

Okada, Keizou Et Al: "A novel red organic electroluminescent device using Eu complex as an emitting layer" Synth. Met. (1998), 97(2), 113–116.

* cited by examiner

Primary Examiner—Marie Yamnitzky
(74) Attorney, Agent, or Firm—Aaron Waxler

(57) ABSTRACT

Luminescent device containing a luminescent material comprising organic lanthanide complexes comprising organic ligands of which at least one organic ligand is an aromatic ketone comprising a substituted electron donor group. This material has improved luminescence properties, and may be used in electroluminescent devices.

13 Claims, 3 Drawing Sheets

LUMINESCENT DEVICE

The invention relates to a luminescent device containing a luminescent material comprising organic lanthanide complexes comprising organic ligands of which at least one organic ligand is an aromatic ketone.

Such luminescent devices are known from WO-A-98/58037, which describes an electroluminescent device comprising a layer of an electroluminescent material in which the electroluminescent material is an organic lanthanide complex comprising a ligand with the formula:

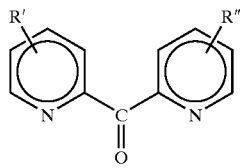

Where each of R" and R' is an aromatic or heterocyclic ring structure which may be substituted or a hydrocarbyl or a fluorocarbon or R" is a halogen such as fluorine or hydrogen. When the ligand is to be incorporated into a polystyrene main chain, R" has to be functionalized.

It is commonly known that the organic lanthanide complexes may be brought into the excited state via a sensitization process, involving the transfer of electronic energy from the excited triplet state of the organic ligand to the excited state of the lanthanide ion. Consequently, there is a very large Stokes' shift between the absorption and emission spectra of the complex. A Stokes' shift as such is advantageous, because it prevents re-absorption of the luminescent light.

However, a very large Stokes' shift is disadvantageous, because luminescence is only observed when excited with a large excitation energy, and only a portion of the excitation energy is emitted as luminescent light.

For instance, to obtain efficient emission in the blue and green, the organic ligand should have an excited state energy of its triplet state which is at least equal to the energy of the accepting state of the lanthanide ion. This requirement implies that the energy of the excited singlet state is at much higher energy, which typically is in the ultraviolet for the blue and in the violet part of the spectrum for the green emitting species.

It is an object of the invention to provide an organic luminescent device with improved properties with respect to the excitation energy of the organic lanthanide complexes. According to the invention, this object is achieved by a luminescent device according to the first paragraph, which is characterized in that a ringstructure bounded to the ketone moiety of said aromatic ketone comprises a substituted electron donor group. Surprisingly, the absorption bands of said new organic lanthanide complexes shift to longer wavelengths and luminescence is observed when excited with a lower energy.

For instance, when the aromatic Michler's ketone (4,4'-bis-(N,N-dimethylamino)-benzophenone) co-ordinates to lanthanide β-diketonates, its absorption band shifts to longer wavelengths and in case of Eu(III) complexes sensitized luminescence is observed, which can be excited with wavelengths well beyond 400 nm. Thus far, such long wavelengths for the excitation of sensitized Eu(III) luminescence have not been published, the longest wavelengths of the absorption maxima of luminescent Eu(III) complexes being around 350 nm.

In order to optimize the organic luminescent component with improved properties at the desired color, the nature of the organic ketone ligand according to the invention, the nature of the other organic ligands and the lanthanide ion may be specifically chosen.

It is preferred within the scope of the present invention that said substituted electron donor group is in the para position with respect to the ketone moiety. The para position ensures the most efficient coupling to the ketone moiety which forms a charge transfer complex with the lanthanide ion.

It is also preferred within the scope of the present invention that the other organic ligands of the lanthanide complex comprise —N, —P, —S or —O complexing functionalities. These additional organic ligands are applied in conjunction with an organic ketone ligand to protect the lanthanide ion by shielding it from a direct interaction with quenching bonds, like —OH, —NH or —CH oscillators. Such quenching bonds may induce radiationless deactivation of the excited state of the lanthanide ion, thus leading to a reduced luminescence efficiency.

Said other organic ligands of the lanthanide complex may comprise diketone, triketone moieties.

Alternatively, said other organic ligands of the lanthanide complex may comprise a complexing moiety of general formula:

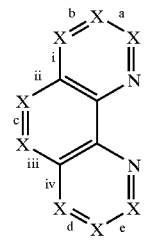

Where X is independently CH or N, preferably at least one of the groups X being N, and the bonds a, b, c, and e, and the combination of bonds i/ii and iii/iv are optionally condensed with a benzene group or a condensed aromatic moiety, wherein aromatic carbon atoms may be replaced by nitrogen atoms and wherein the complexing moiety may be substituted with $C_1$–$C_6$ alkyl, $C_2$–$C_6$ alkenyl, $C_2$–$C_6$ alkynyl, $C_3$–$C_4$ alkylene, CN, halogen, COOH, $C_1$–$C_3$ alkyl-COOH, $NO_2$, $NH_2$, or a pending group for further functionalization or complexation.

It is preferred within the scope of the present invention that the lanthanide ion is selected from Eu(III), Dy(III), Sm(III), Ce(III), Eu(II), Tm(III), Tb(III), Nd(III), Yb(III) and Er(III). In such an embodiment:

Ce(III), Eu(II) and Tm(III) yield blue luminescent light.

Tb(III) yields green luminescent light.

Eu(III), Dy(III) and Sm(III) yield orange/red luminescent light.

Nd(III), Yb(III) and Er(III) yield near infra-red luminescent light

In order to obtain an electroluminescent device, the lanthanide complexes according to the invention are preferably contained in an electrically conducting layer of an organic material. An electroluminescent (EL) device is a device, which, while making use of the phenomenon of electroluminescence, emits light, when the device is suitably connected to a power supply. If the light emission originates in an organic material, said device is referred to as an organic electroluminescent device. An organic EL device can be used, inter alia, as a thin light source having a large luminous surface area, such as a backlight for a liquid crystal display, e.g. for a watch. An organic EL device can also be used as a display if the EL device comprises a number of EL elements, which may or may not be independently addressable.

The use of organic layers as an EL layer in an EL device is known. Known organic layers comprise organic lanthanide complexes as a luminescent compound. The EL device comprises two electrodes, which are in contact with the organic layer. By applying a suitable voltage, the negative electrode, i.e. the cathode, will inject electrons and the positive electrode, i.e. the anode, will inject holes. If the EL device is in the form of a stack of layers, at least one of the electrodes should be transparent to the light to be emitted. A known transparent electrode material for the anode is, for example, indium tin oxide (ITO). Known electrode materials for the cathode are aluminum, magnesium, calcium, lithium, magnesium/silver alloys, and magnesium/indium alloys. The EL device may comprise additional organic layers, which serve to improve the charge transport or the charge injection. Said layers may comprise electron-conducting layers (called 'n-type conducting layers') and hole-conducting layers (called 'p-type conducting layers).

A first embodiment of the present invention is characterized in that said lanthanide complexes are contained in an electrically conducting layer of an n-type conducting organic material.

Preferably said n-type conducting organic material is a polymer. This n-type conducting organic layer may be combined with a layer of a p-type conducting material. Said p-type conducting material may be an organic material, which may also be a polymer.

A second embodiment of the present invention is characterized in that said lanthanide complexes are contained in an electrically conducting layer of an p-type conducting organic material.

Preferably said p-type conducting organic material is a polymer. This p-type conducting organic layer may be combined with a layer of a n-type conducting material. Said n-type material may be an organic material, which may also be a polymer.

A third embodiment of the present invention is characterized in that said lanthanide complexes are contained in a layer, which is stacked between a layer of a p-type conducting material and a layer of an n-type conducting material.

Preferably at least one of said p-type or n-type electrically conducting layers is made from an organic material. Said electrically conducting organic material may be a polymer.

The invention will be explained in more detail below with reference to Figures and examples.

Figure 5A:
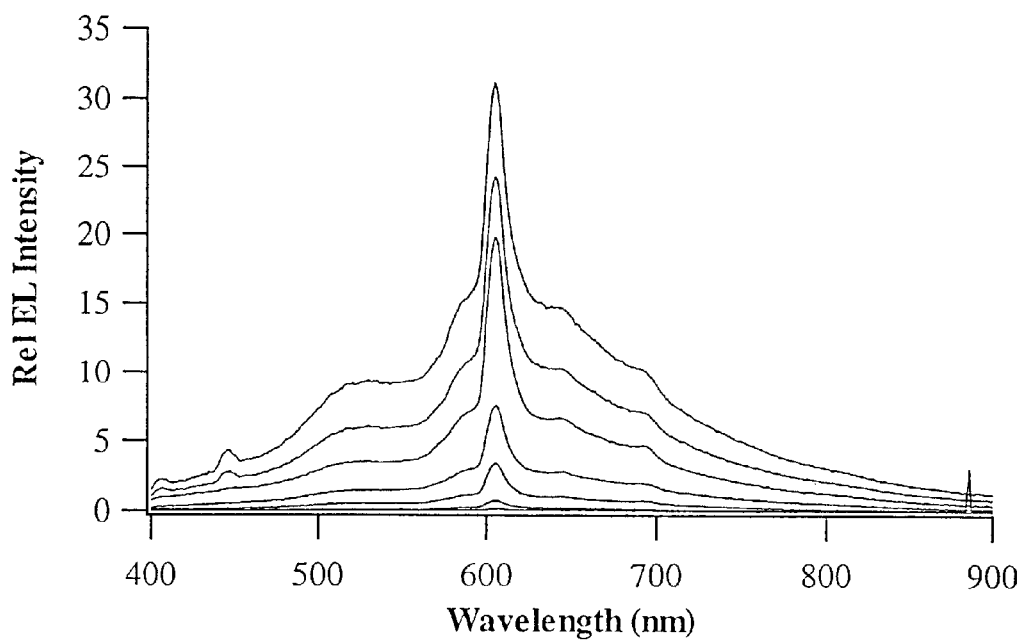

FIG. 5A shows the emission spectrum of an electroluminescent device according to example 5, comprising 10 weight per cent MK-EuFOD (europium tris[6,6,7,7,8,8,8-heptafluoro-2,2-dimethyloctane-3,5-dione]) complexes in PVK (polyvinylcarbazole). The applied voltages range from 17 to 27 Volt.

Figure 5B:
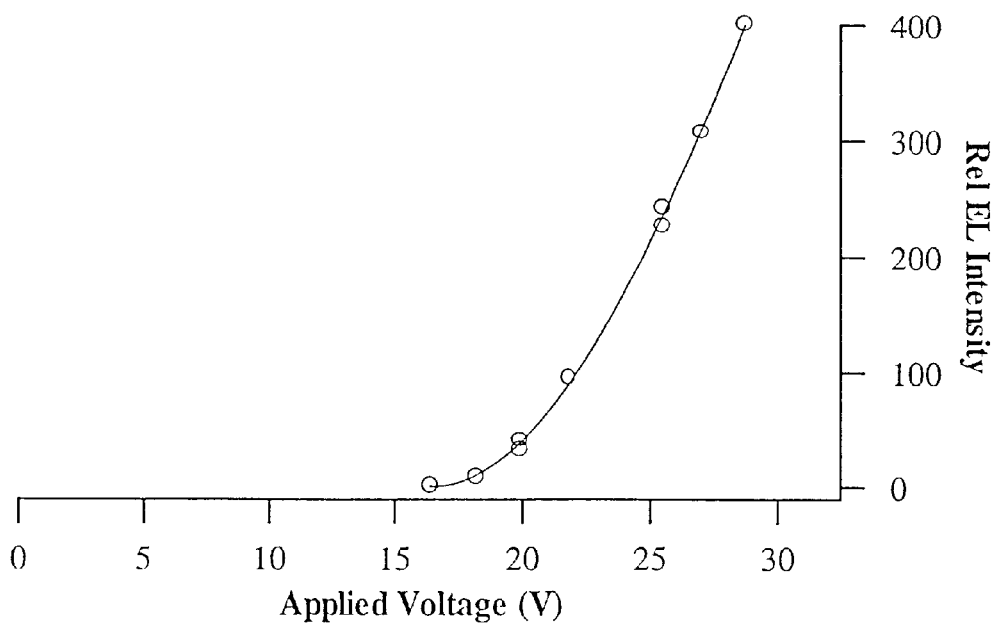

FIG. 5B shows the dependence of the electroluminescence intensity with the applied voltage over the EL device according to example 5. The solid line is a guide to the eye.

The organic EL device according to the invention comprises a layer structure with a substrate layer 1, a first transparent electrode layer 2, one or several layers 3, as well as a second electrode 4. Said layers may comprise a p-type conducting organic material 31 and an n-type conducting organic material 33, with a luminescent material with one or several lanthanide complexes according to the invention 32.

A DC voltage is applied to the two electrodes during operation. The first electrode is at a positive potential (anode), the second at a negative potential (cathode).

Figure 1:
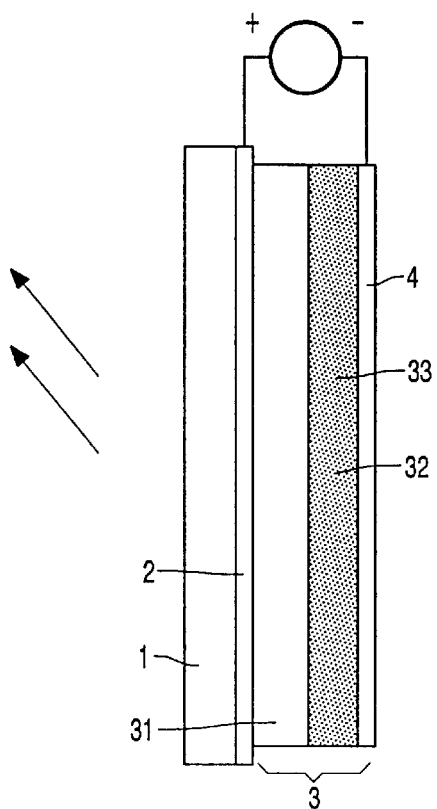
FIG. 1 shows a schematic cross-section of a first embodiment of an electroluminescent device according to the invention.
Figure 2:
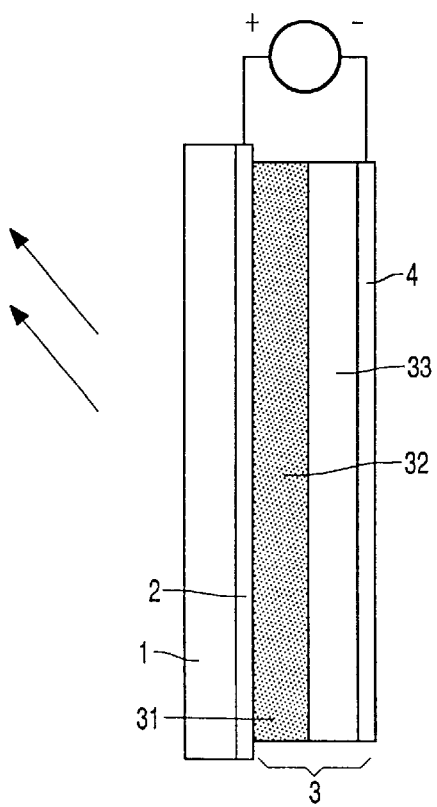
FIG. 2 shows a schematic cross-section of a second embodiment of an electroluminescent device according to the invention.

Usually, two separate layers form the optoelectronic intermediate layer 3. One for the p-type conducting material 31, and an other for the n-type conducting material 33. In this case, either the n-type layer, as in FIG. 1, or the p-type layer, as in FIG. 2, may in addition comprise the electroluminescent material 32.

Figure 3:
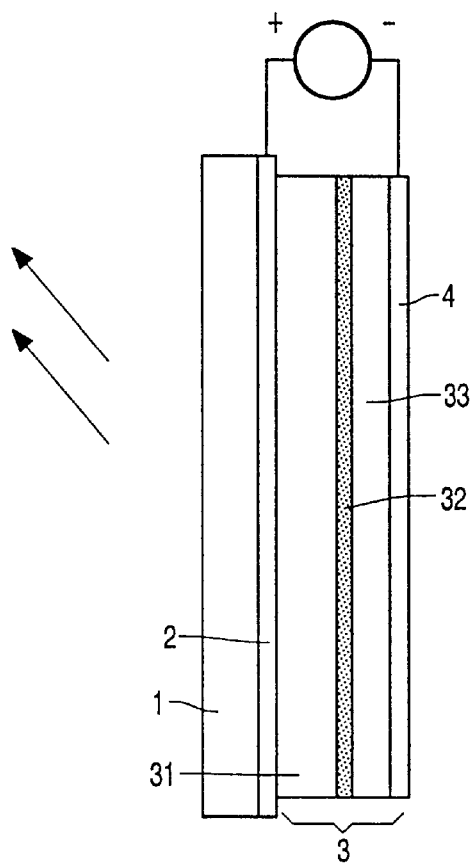
FIG. 3 shows schematic cross-section of a third embodiment of an electroluminescent device according to the invention.

In a third embodiment shown in FIG. 3, the three materials are arranged in three separate layers: hole conductor 31, luminescent layer 32, electron conductor 33.

EXAMPLE 1

Figure 4:
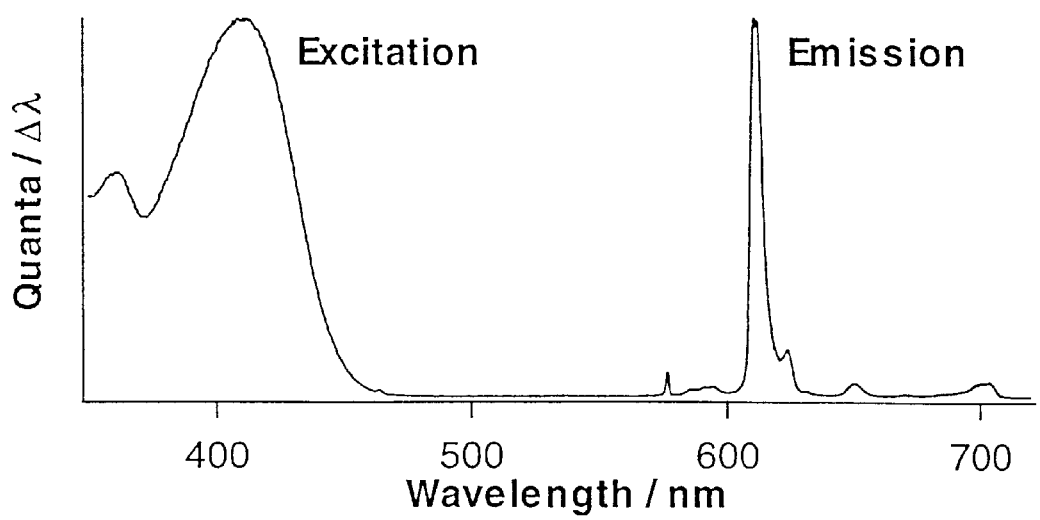
FIG. 4 shows a corrected luminescence excitation (emission wavelength=612 nm) and emission (excitation wavelength=450 nm) spectra of a solution of $10^{-5}$ M Michler's ketone (MK) and $10^{-4}$ M EuFOD (europium tris[6,6,7,7,8,8,8-heptafluoro-2,2-dimethyloctane-3,5-dione]).

When colorless solutions of MK and EuFOD, in benzene (both 1 mM) are mixed, a yellow color develops instantaneously. Moreover, a red glow emerges from the solution under daylight illumination. The emission spectrum (FIG. 4) demonstrates that this red glow is Eu(III) luminescence: the sharp peaks are characteristic of lanthanide ion emission, Eu(III) usually having its most intense emission around 615 nm. The corresponding excitation spectrum is in accordance with the observation that this luminescence can be excited by visible light. With its absorption maximum at 414 nm, its absorption extends well beyond 420 nm which is rather surprising, since it is usually assumed that—as a result of energetic constraints—sensitised Eu(III) luminescence can only be generated by excitation at wavelengths <380 nm (F. J. Steemers, W. Verboom, D. N. Reinhoudt, E. B. Van der Tol, J. W. Verhoeven, *J. Am. Chem. Soc.* 117 (1995) 9408). The quantum yield was found to be 0.17 in aerated solution and 0.20 after deoxygenation by four freeze-pump-thaw cycles (excitation at 420 nm, using quinine bisulphate in 1 M $H_2SO_4$ as a reference). The appearance of the bathochromically shifted absorption band is also observed for the other lanthanide ions, for instance, addition of YnFOB, ErFOB, GdFOD or PrFOD to MK in benzene produces in all cases the same 414 nm absorption. Obviously, the red glow is only observed within EuFOD.

EXAMPLE 2

When colorless solutions of MK and Eu(dpm)$_3$ (dpm=2,2,6,6-tetramethylheptane-3,5-dionate) in benzene (both 1 mM) are mixed, a yellow color develops instantaneously. Moreover, a red glow emerges from the solution under daylight illumination. A bathochromically shifted absorption spectrum with a maximum at 398 nm is observed for the MK-Eu(dpm)$_3$ complex.

EXAMPLE 3

When colorless solutions of MK and Eu(hfa)$_3$ (hfa=1,1,1,5,5,5-hexafluoro-2,4-pentanedionate) in benzene (both 1 mM) are mixed, a yellow color develops instantaneously.

Moreover, a red glow emerges from the solution under daylight illumination. A bathochromically shifted absorption spectrum with a maximum at 430 nm is observed for the MK-Eu(hfa)$_3$ complex.

EXAMPLE 4

Bathochromic shifts have also been observed for complexes of the aromatic ketone containing dyes Nile Red and Phenol Blue induced by LnFOD. These two aromatic ketones have lower energy triplet states and sensitize the near-IR emitting lanthanides, ytterbium and erbium.

EXAMPLE 5

Electroluminescence has been observed from an EL device comprising an Aluminium cathode layer, a transparent indium tin oxide (ITO) anode layer, and a layer of poly-vinylcarbazole (PVK) in-between the cathode and anode layer (see FIG. 5A). Said PVK layer comprises the MK-EuFOD complex as the electroluminescent material (10 weight per cent MK-EuFOD in PVK). By applying a suitable voltage, the negative electrode, i.e. the cathode, will inject electrons and the positive electrode, i.e. the anode, will inject holes, and electroluminescence is observed (see FIG. 5B).

In short, we claim a luminescent device containing a luminescent material comprising organic lanthanide complexes comprising organic ligands of which at least one organic ligand is an aromatic ketone comprising a substituted electron donor group. This material has improved luminescence properties, and may be used in electroluminescent devices.

It will be clear that within the invention as claimed many variations are possible.

What is claimed is:

1. A luminescent device containing a luminescent material comprising organic lanthanide complexes comprising organic ligands of which at least one organic ligand is an aromatic ketone characterized in that a ringstructure bonded to the ketone moiety of said aromatic ketone comprises a substituted electron donor group in a para position with respect to the ketone moiety, wherein said organic lanthanide complexes have at least one lanthanide ion for forming a charge transfer complex with said ketone moiety.

2. A luminescent device as claimed in claim 1 characterized in that at least one organic ligand of the lanthanide complex comprises —N, —P, —S or —O complexing functionalities.

3. A luminescent device as claimed in claim 2 characterized in that at least one organic ligand of the lanthanide complex comprises a diketone moiety.

4. A luminescent device as claimed in claim 2 characterized in that at least one organic ligand of the lanthanide complex comprise a complexing moiety of general formula:

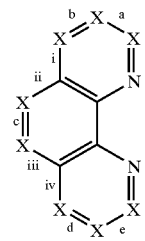

where X is independently CH or N and the bonds a, b, c, and e, and the combination of bonds i/ii and iii/iv are optionally condensed with a benzene group or a condensed aromatic moiety, wherein aromatic carbon atoms may be replaced by nitrogen atoms and wherein the complexing moiety may be substituted with $C_1$–$C_6$ alkyl, $C_2$–$C_6$ alkenyl, $C_2$–$C_6$ alkynyl, $C_3$–$C_4$ alkylene, CN, halogen, COOH, $C_1$–$C_3$ alkyl-COOH, $NO_2$ or $NH_2$.

5. A luminescent device as claimed in claim 2 characterized in that at least one organic ligand of the lanthanide complex comprises a triketone moiety.

6. A luminescent device as claimed in claim 1 characterized in that said lanthanide is selected from Eu(III), Dy(III), Sm(III), Ce(III), Eu(II), Tm(III), Tb(III), Nd(III), Yb(III) and Er (III).

7. A luminescent device as claimed in claim 1 characterized in that said lanthanide complexes are contained in an electrically conducting layer of an n-type conducting organic material.

8. A luminescent device as claimed in claim 7 characterized in that said n-type conducting organic material is a polymer.

9. A luminescent device as claimed in claim 1 characterized in that said lanthanide complexes are contained in an electrically conducting layer of a p-type conducting organic material.

10. A luminescent device as claimed in claim 9 characterized in that said p-type conducting organic material is a polymer.

11. A luminescent device as claimed in claim 1 characterized in that said lanthanide complexes are contained in a layer which is stacked between a layer of a p-type electrically conducting material and a layer of an n-type electrically conducting material.

12. A luminescent device as claimed in claim 11 characterized in that at least one of said p-type or n-type electrically conducting layers is made from an organic material.

13. A luminescent device as claimed in claim 12 characterized in that said electrically conducting organic material is a polymer.

* * * * *